(12) United States Patent
Lan

(10) Patent No.: US 7,384,106 B2
(45) Date of Patent: Jun. 10, 2008

(54) COMPUTER HOUSING

(75) Inventor: Pen-Hu Lan, Taipei Hsien (TW)

(73) Assignee: Aopen Inc., Taipei Hsien (TW)

( * ) Notice: Subject to any disclaimer, the term of this patent is extended or adjusted under 35 U.S.C. 154(b) by 214 days.

(21) Appl. No.: 11/109,683

(22) Filed: Apr. 20, 2005

(65) Prior Publication Data

US 2006/0017355 A1 Jan. 26, 2006

(30) Foreign Application Priority Data

Jul. 23, 2004 (TW) .............................. 93122094 A

(51) Int. Cl.
*A47B 81/00* (2006.01)
*A47B 97/00* (2006.01)

(52) U.S. Cl. .................................................. 312/223.2

(58) Field of Classification Search .............. 312/223.2, 312/223.1, 685, 683, 732, 724–727, 740, 312/747, 759, 801, 684, 686; 292/194, 209, 292/210, 296, 334
See application file for complete search history.

(56) References Cited

U.S. PATENT DOCUMENTS

| | | | | |
|---|---|---|---|---|
| 2,532,767 A | * | 12/1950 | Galkin | 248/635 |
| 4,979,909 A | * | 12/1990 | Andrews | 439/352 |
| 5,413,427 A | * | 5/1995 | Giles et al. | 400/691 |
| 5,683,159 A | * | 11/1997 | Johnson | 312/334.7 |
| 6,094,342 A | * | 7/2000 | Dague et al. | 361/685 |
| 6,227,516 B1 | * | 5/2001 | Webster et al. | 248/694 |
| 6,275,377 B1 | * | 8/2001 | Liu et al. | 361/685 |
| 6,297,952 B1 | * | 10/2001 | Liu et al. | 361/685 |
| 6,396,686 B1 | * | 5/2002 | Liu et al. | 361/685 |
| 6,654,240 B1 | * | 11/2003 | Tseng et al. | 361/685 |
| 6,728,109 B1 | * | 4/2004 | Wu | 361/747 |
| 6,853,549 B2 | * | 2/2005 | Xu | 361/685 |
| 6,914,778 B2 | * | 7/2005 | Deckers et al. | 361/685 |
| 2003/0095378 A1 | * | 5/2003 | Jeong | 361/685 |
| 2004/0037049 A1 | * | 2/2004 | Erickson et al. | 361/726 |

FOREIGN PATENT DOCUMENTS

CN 2606920 Y 3/2004

* cited by examiner

*Primary Examiner*—Janet M. Wilkens
*Assistant Examiner*—Timothy M Ayres
(74) *Attorney, Agent, or Firm*—Foley & Lardner LLP

(57) ABSTRACT

A fastening mechanism includes an engaging block formed with an engaging post extending through a through hole unit in a frame body and into a fastening hole in a peripheral device. A pressing member has an interconnecting pressing portion interconnecting a pivot end portion connected pivotally to a pivot member on the frame body, and an operable anchoring end portion, and is pivotable relative to the pivot member so as to move from a releasing position, where the anchoring end portion disengages an anchoring member on the frame body and where the interconnecting pressing portion is spaced apart from the engaging block, to an anchoring position, where the anchoring end portion engages the anchoring member on the frame body and where the pivot end portion and the interconnecting pressing portion abut against the engaging block.

11 Claims, 5 Drawing Sheets

COMPUTER HOUSING

CROSS-REFERENCE TO RELATED APPLICATION

This application claims priority of Taiwanese Application No. 093122094, filed on Jul. 23, 2004.

BACKGROUND OF THE INVENTION

1. Field of the Invention

The invention relates to a computer housing, more particularly to a computer housing capable of fastening a peripheral device thereto without the need for tools.

2. Description of the Related Art

Assembly of a peripheral device, such as a floppy disk drive, a hard disk drive or an optical disk drive, to a conventional computer housing can be achieved by means of screw fasteners, each of which extends through a through hole in the conventional computer housing and engages threadedly a screw hole in the peripheral device.

Due to the use of the screw fasteners, tools for tightening and loosening the same, such as various types of screwdrivers, are required during assembly and detachment, thereby arising in inconvenience during use.

SUMMARY OF THE INVENTION

Therefore, the object of the present invention is to provide a computer housing that is capable of fastening a peripheral device thereto without the need for tools.

According to one aspect of the present invention, there is provided a computer housing adapted for fastening a peripheral device thereto. The peripheral device is formed with a fastening hole. The computer housing comprises:

a frame body formed with a pivot member, an anchoring member, and a through hole unit disposed between and spaced apart from the pivot member and the anchoring member in a first direction;

an engaging block having a first side that faces the frame body and that is formed with an engaging post extending through the through hole unit and adapted to extend into the fastening hole in the peripheral device, and a second side opposite to the first side in a second direction transverse to the first direction; and a pressing member disposed on the second side of the engaging block and having a pivot end portion connected pivotally to the pivot member on the frame body, an operable anchoring end portion opposite to the pivot end portion, and an interconnecting pressing portion interconnecting the pivot end portion and the anchoring end portion;

the pressing member being pivotable relative to the pivot member on the frame body so as to move from a releasing position, where the anchoring end portion disengages the anchoring member on the frame body and where the interconnecting pressing portion is spaced apart from the second side of the engaging block, to an anchoring position, where the anchoring end portion engages the anchoring member on the frame body and where the pivot end portion and the interconnecting pressing portion abut against the second side of the engaging block such that the engaging block is fastened securely to the frame body so as to maintain engagement between the engaging post and the fastening hole in the peripheral device.

According to another aspect of the present invention, there is provided a fastening mechanism for fastening a peripheral device to a frame body. The peripheral device is formed with a fastening hole. The frame body is formed with a pivot member, an anchoring member, and a through hole unit disposed between and spaced apart from the pivot member and the anchoring member in a first direction. The fastening mechanism comprises:

an engaging block having a first side that is adapted to face the frame body and that is formed with an engaging post adapted to extend through the through hole unit and adapted to extend into the fastening hole in the peripheral device, and a second side opposite to the first side in a second direction transverse to the first direction; and a pressing member disposed on the second side of the engaging block and having a pivot end portion adapted to be connected pivotally to the pivot member on the frame body, an operable anchoring end portion opposite to the pivot end portion, and an interconnecting pressing portion interconnecting the pivot end portion and the anchoring end portion;

the pressing member being pivotable relative to the pivot member on the frame body so as to move from a releasing position, where the anchoring end portion is adapted to disengage the anchoring member on the frame body and where the interconnecting pressing portion is spaced apart from the second side of the engaging block, to an anchoring position, where the anchoring end portion is adapted to engage the anchoring member on the frame body and where the pivot end portion and the interconnecting pressing portion abut against the second side of the engaging block such that the engaging block is adapted to be fastened securely to the frame body so as to maintain engagement between the engaging post and the fastening hole in the peripheral device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
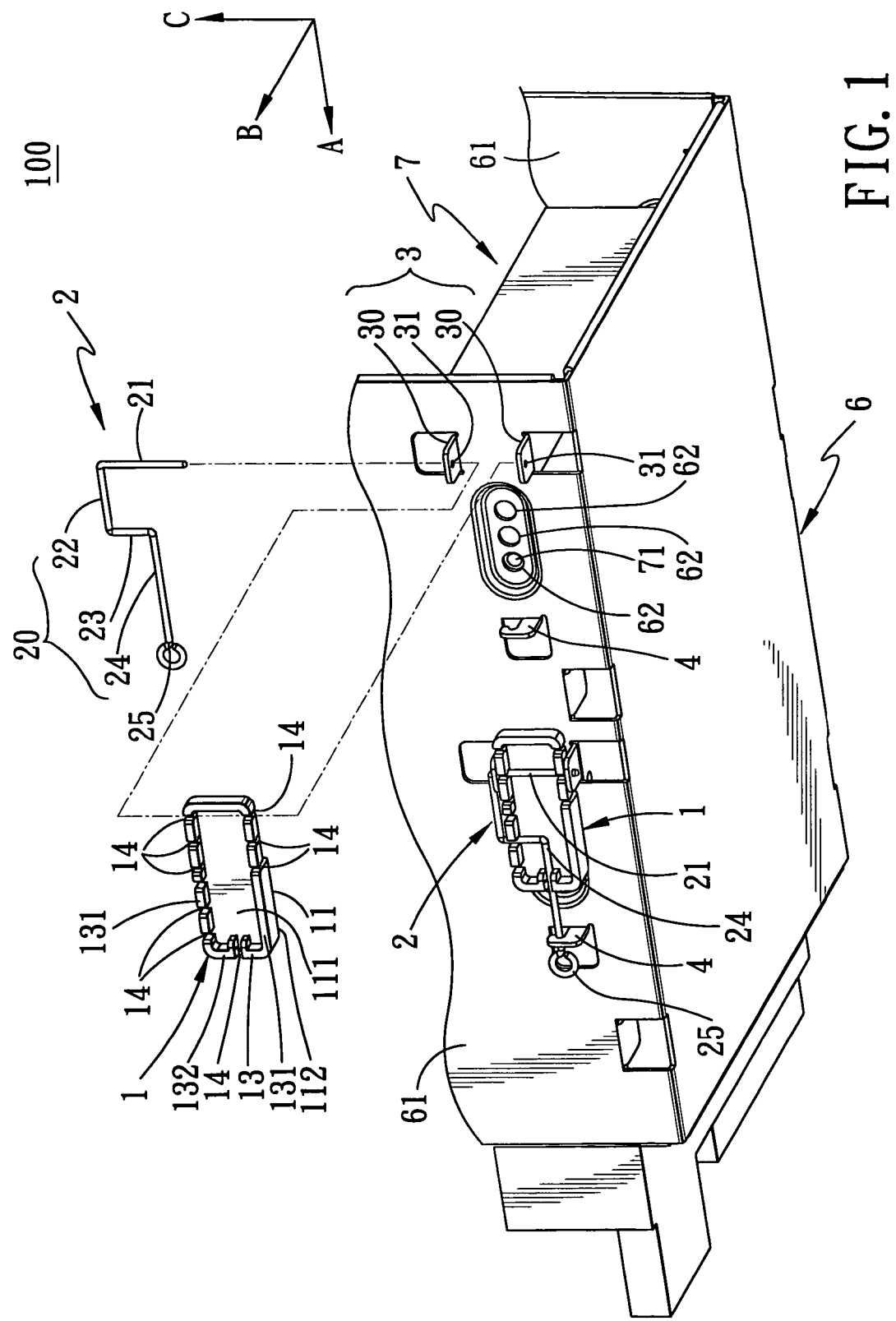
FIG. 1 is a partly exploded, perspective view showing the first preferred embodiment of a computer housing according to this invention.

Before the present invention is described in greater detail, it should be noted that like elements are denoted by the same reference numerals throughout the disclosure.

Figure 2:
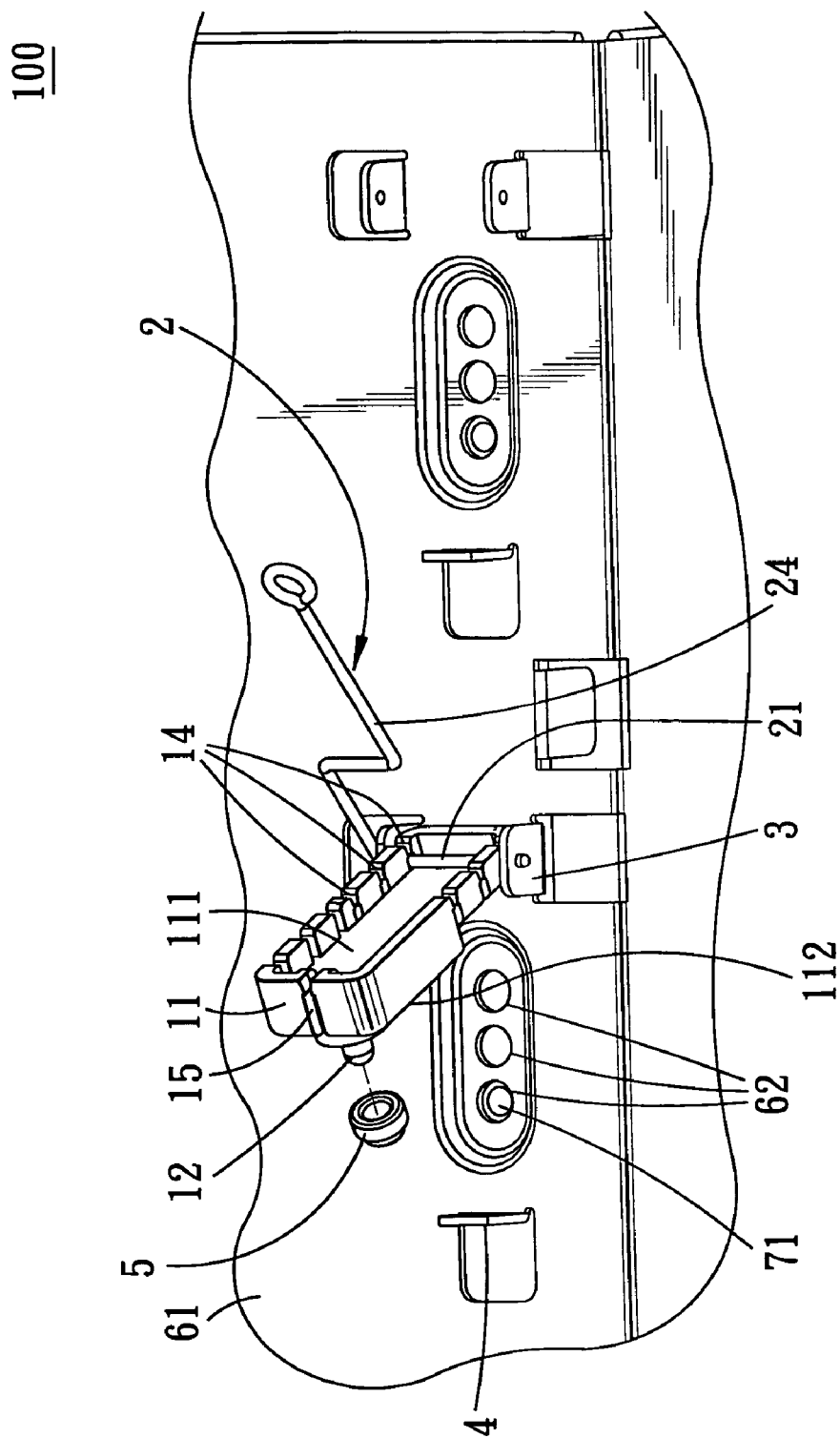
FIG. 2 is a fragmentary perspective view showing the first preferred embodiment when a pressing member thereof is in a releasing position.

Referring to FIGS. 1 and 2, the first preferred embodiment of a computer housing 100 according to the present invention is shown to be adapted for fastening a peripheral device 7, such as an optical disk drive, thereto. The peripheral device 7 has opposite lateral sides, each of which is formed with a plurality of fastening holes 71 (only one is shown).

The computer housing 100 includes a frame body 6, a plurality of engaging blocks 1, and a plurality of pressing members 2.

In this embodiment, the frame body 6 includes opposite supporting walls 61 confining an accommodating space therebetween for receiving the peripheral device 7. Each supporting wall 61 corresponds to a respective one of the lateral sides of the peripheral device 7. For each fastening hole 71 in the peripheral device 7, the corresponding supporting wall 61 is formed with a pivot member 3, an anchoring member 4, and a through hole unit disposed between and spaced apart from the pivot member 3 and the anchoring member 4 in a first direction (A) In this embodiment, the pivot member 3 includes a pair of pivot lugs 30 opposite to each other in a third direction (C) transverse to the first direction (A). Each of the pivot lugs 30 is formed by punching, and is formed with a pivot hole 31. In this embodiment, the anchoring member 4 is an anchoring hook, which is also formed by punching. In this embodiment, the through hole unit includes a set of through holes 62 spaced apart from each other in the first direction (A).

Figure 3:
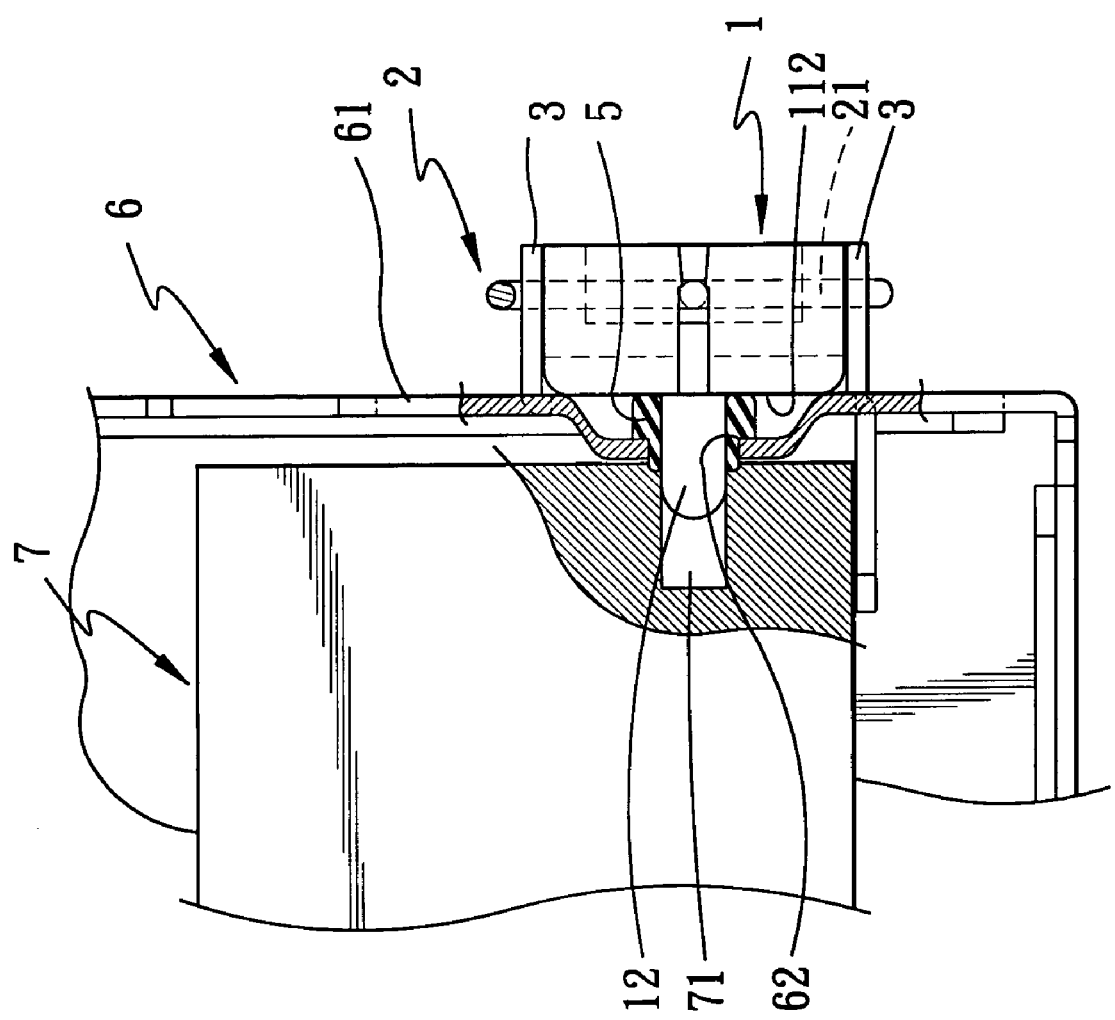
FIG. 3 is a fragmentary schematic sectional view showing the first preferred embodiment when the pressing member is in an anchoring position.

Each of the engaging blocks 1 has a first side 112 that faces a corresponding one of the supporting walls 61 and that is formed with an engaging post 12 extending removably through a selected through hole 62 of a corresponding one of the through hole units and adapted to extend into a corresponding one of the fastening holes 71 in the peripheral device 7, as shown in FIG. 3, and a second side 111 opposite to the first side 112 in a second direction (B) transverse to the first and third directions (A, C). In this embodiment, the second side 111 of each engaging block 1 is formed with a plurality of engaging grooves 14 spaced apart from each other.

Each of the pressing members 2 is disposed on the second side 111 of a corresponding one of the engaging blocks 1, and has a pivot end portion 21 connected pivotally to the respective pivot member 3 on the frame body 6, an operable anchoring end portion 25 opposite to the pivot end portion 21, and an interconnecting pressing portion 20 interconnecting the pivot end portion 21 and the anchoring end portion 25. Each pressing member 2 is pivotable relative to the respective pivot member 3 on the frame body 6 so as to move from a releasing position, where the anchoring end portion 25 disengages a respective anchoring member 4 on the frame body 6 and where the interconnecting pressing portion 20 is spaced apart from the second side 111 of a respective engaging block 1, as shown in FIG. 2, to an anchoring position, where the anchoring end portion 25 engages the respective anchoring member 4 on the frame body 6 and where the pivot end portion 21 and the interconnecting pressing portion 20 abut against the second side 111 of the respective engaging block 1, as shown in FIG. 1, such that the respective engaging block 1 is fastened securely to the frame body 6 so as to maintain engagement between the engaging post 12 on the respective engaging block 1 and the corresponding fastening hole 71 in the peripheral device 7.

In this embodiment, each pressing member 2 is a bent rod body that includes a first section extending in the third direction (C) and serving as the pivot end portion 21, a second section 22 connected to the first section and extending in the first direction (A), a third section 23 connected to the second section 22 and parallel to the first section, a fourth section 24 connected to the third section 23, parallel to the second section 22 and cooperating with the second and third sections 22, 23 to define the interconnecting pressing portion 20, and a fifth section connected to and extending from the fourth section 24 and serving as the anchoring end portion 25. The first section (i.e., the pivot end portion 21) of each rod body extends through the pivot holes 31 in the pivot lugs 30 of a respective pivot member 3. The fifth section 25 of each pressing member 2 engages removably the anchoring hook of the respective anchoring member 4 on the frame body 6 when the pressing member 2 is in the anchoring position (see FIG. 1). In this embodiment, each of the first, third and fourth sections 21, 23, 24 of the rod body of each pressing member 2 engages a corresponding one of the engaging grooves 14 in the second side 111 of the respective engaging block 1 when the pressing member 2 is in the anchoring position.

A cushion member 5 is mounted on the engaging post 12 on each engaging block 1, and abuts against the frame body 6 and the first side 112 of each engaging block 1, as shown in FIG. 3.

Figure 4:
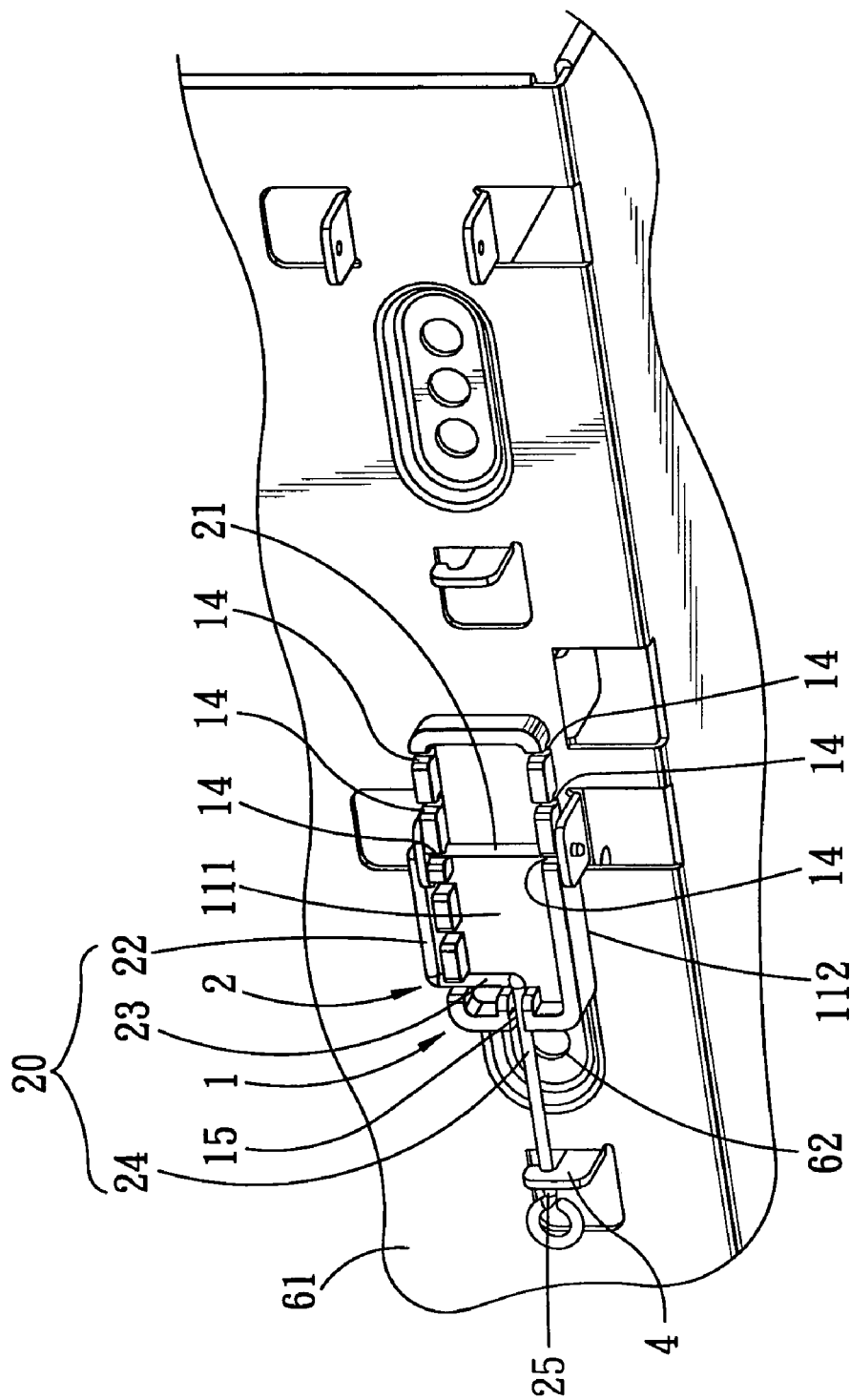
FIG. 4 is a fragmentary perspective view showing the first preferred embodiment in another state of use.

When it is required to adjust the position of the peripheral device 7 in the computer housing 100, by virtue of the through hole units in the frame body 6 and the engaging grooves 14 in each engaging block 1, each engaging block 1 is movable so that the engaging post 12 on each engaging block 1 extends through a desired one of the through holes 62 of the through hole units, as shown in FIG. 4.

Figure 5:
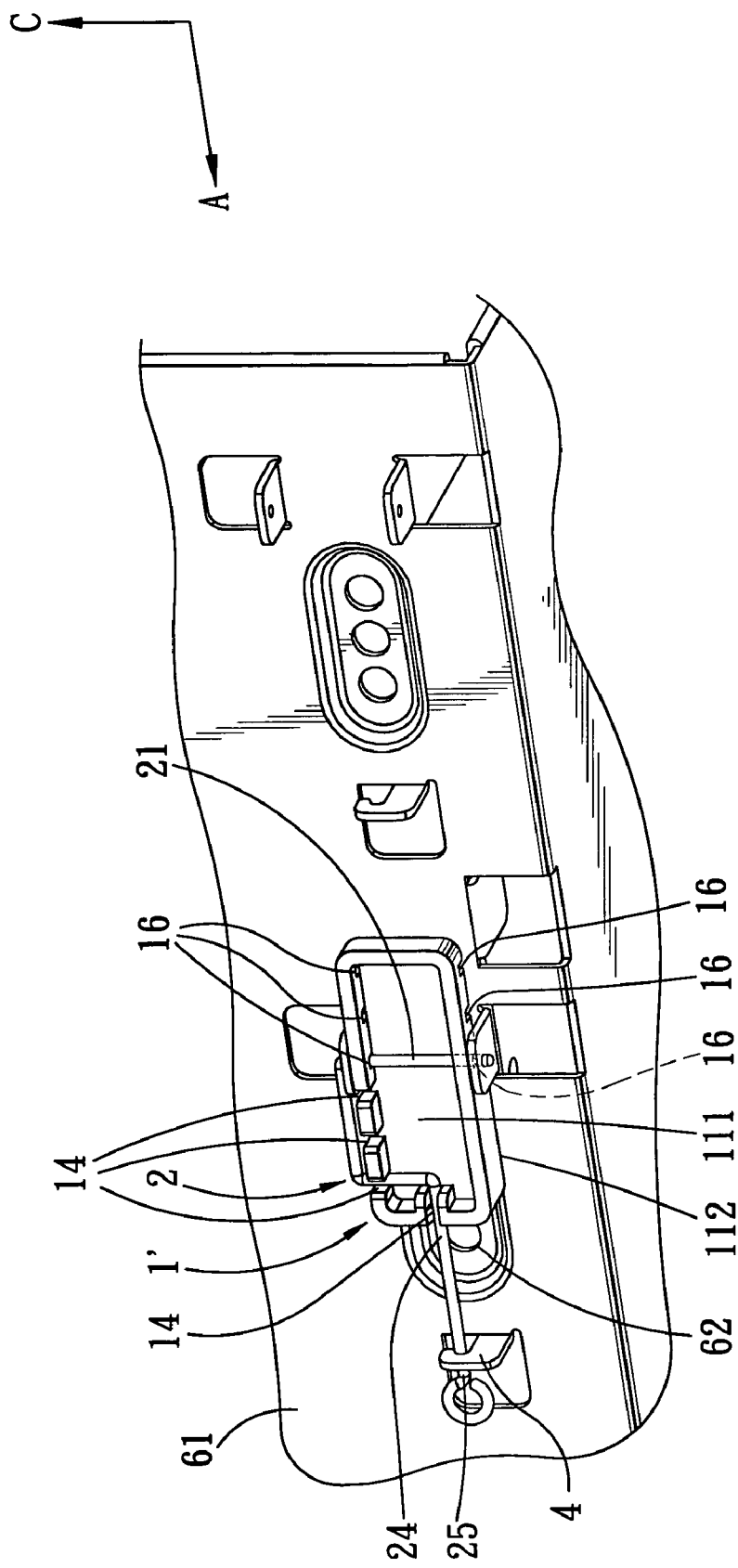
FIG. 5 is a fragmentary perspective view showing the second preferred embodiment of a computer housing according to this invention.

FIG. 5 illustrates the second preferred embodiment of a computer housing according to this invention, which is a modification of the first preferred embodiment. In this embodiment, each engaging block 1' is formed with an engaging hole unit disposed adjacent to the second side 111 for permitting extension of the first section 21 of the rod body of a corresponding pressing member 2, and a plurality of engaging grooves 14 spaced apart from each other in the second side 111. Each of the third and fourth sections 23, 24 of the rod body of the pressing member 2 engages a corresponding one of the engaging grooves 14. In this embodiment, the engaging hole unit in each engaging block 1' includes a plurality of pairs of engaging holes 16 spaced apart from each other in the first direction (A), wherein the engaging holes 16 in each pair are opposite to each other in the third direction (C). The first section 21 of the rod body of each pressing member 2 extends through a selected pair of the engaging holes 16 in the respective engaging block 1'.

To sum up, by manually operating the pressing members 2, the computer housing 100 of this invention can enable fastening of the peripheral device 7 thereto without the need for tools, thereby resulting in convenience during assembly and detachment.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A computer housing adapted for fastening a peripheral device thereto, the peripheral device being formed with a fastening hole, said computer housing comprising:
   a frame body formed with a pivot member, an anchoring member, and a through hole unit disposed between and spaced apart from said pivot member and said anchoring member in a first direction;
   an engaging block having a first side that faces said frame body and that is formed with an engaging post extending through said through hole unit and adapted to extend into the fastening hole in the peripheral device, and a second side opposite to said first side in a second direction transverse to the first direction; and a pressing member disposed on said second side of said engaging block and having a pivot end portion connected pivotally to said pivot member on said frame body, an operable anchoring end portion opposite to said pivot end portion, and an interconnecting pressing portion interconnecting said pivot end portion and said anchoring end portion;

said pressing member being pivotable relative to said pivot member on said frame body so as to move from a releasing position, where said anchoring end portion disengages said anchoring member on said frame body and where said interconnecting pressing portion is spaced apart from said second side of said engaging block, to an anchoring position, where said anchoring end portion engages said anchoring member on said frame body and where said pivot end portion and said interconnecting pressing portion abut against said second side of said engaging block such that said engaging block is fastened securely to said frame body so as to maintain engagement between said engaging post and the fastening hole in the peripheral device;

wherein said pressing member is a bent rod body that includes a first section extending in a third direction transverse to the first and second directions and serving as said pivot end portion, a second section connected to said first section and extending in the first direction, a third section connected to said second section and parallel to said first section, a fourth section connected to said third section, parallel to said second section and cooperating with said second and third sections to define said interconnecting pressing portion, and a fifth section connected to and extending from said fourth section and serving as said anchoring end portion; and wherein said second side of said engaging block is formed with a plurality of engaging grooves spaced apart from each other, each of said first, third and fourth sections of said rod body engaging a corresponding one of said engaging grooves when said pressing member is in the anchoring position.

2. The computer housing as claimed in claim 1, wherein said pivot member on said frame body includes a pair of pivot lugs opposite to each other in the third direction, said engaging block extending between said pivot lugs, each of said pivot lugs being formed with a pivot hole for permitting extension of said first section of said rod body therethrough.

3. The computer housing as claimed in claim 1, wherein said anchoring member on said frame body is an anchoring hook for engaging removably said fifth section of said rod body when said pressing member is in the anchoring position.

4. The computer housing as claimed in claim 1, wherein said through hole unit in said frame body includes a set of through holes spaced apart from each other in the first direction, said engaging post extending removably through a selected one of said through holes.

5. The computer housing as claimed in claim 1, further comprising a cushion member mounted on said engaging post on said engaging block and abutting against said frame body and said first side of said engaging block.

6. The computer housing as claimed in claim 1, wherein said engaging block is formed with an engaging hole unit disposed adjacent to said second side for permitting extension of said first section of said rod body.

7. The computer housing as claimed in claim 6, wherein said engaging hole unit includes a plurality of pairs of engaging holes spaced apart from each other in the first direction, said engaging holes in each pair being opposite to each other in the third direction, said first section of said rod body extending through a selected pair of said engaging holes.

8. A fastening mechanism for fastening a peripheral device to a frame body, the peripheral device being formed with a fastening hole, the frame body being formed with a pivot member, an anchoring member, and a through hole unit disposed between and spaced apart from the pivot member and the anchoring member in a first direction, said fastening mechanism comprising:

an engaging block having a first side that is adapted to face the frame body and that is formed with an engaging post adapted to extend through the through hole unit and adapted to extend into the fastening hole in the peripheral device, and a second side opposite to said first side in a second direction transverse to the first direction; and a pressing member disposed on said second side of said engaging block and having a pivot end portion adapted to be connected pivotally to the pivot member on the frame body, an operable anchoring end portion opposite to said pivot end portion, and an interconnecting pressing portion interconnecting said pivot end portion and said anchoring end portion;

said pressing member being pivotable relative to the pivot member on the frame body so as to move from a releasing position, where said anchoring end portion is adapted to disengage the anchoring member on the frame body and where said interconnecting pressing portion is spaced apart from said second side of said engaging block, to an anchoring position, where said anchoring end portion is adapted to engage the anchoring member on the frame body and where said pivot end portion and said interconnecting pressing portion abut against said second side of said engaging block such that said engaging block is adapted to be fastened securely to the frame body so as to maintain engagement between said engaging post and the fastening hole in the peripheral device;

wherein said pressing member is a bent rod body that includes a first section extending in a third direction transverse to the first and second directions and serving as said pivot end portion, a second section connected to said first section and extending in the first direction, a third section connected to said second section and parallel to said first section, a fourth section connected to said third section, parallel to said second section and cooperating with said second and third section to define said interconnecting pressing portion, and a fifth section connected to and extending from said fourth section and serving as said anchoring end portion; and wherein said second side of said engaging block is formed with a plurality of engaging grooves spaced apart from each other, each of said first, third and fourth sections of said rod body engaging a corresponding one of said engaging grooves when said pressing member is in the anchoring position.

9. The fastening mechanism as claimed in claim 8, further comprising a cushion member mounted on said engaging post on said engaging block, abutting against said first side of said engaging block, and adapted to abut against the frame body.

10. The fastening mechanism as claimed in claim 8, wherein said engaging block is formed with an engaging hole unit disposed adjacent to said second side for permitting extension of said first section of said rod body.

11. The fastening mechanism as claimed in claim 10, wherein said engaging hole unit includes a plurality of pairs of engaging holes spaced apart from each other in the first direction, said engaging holes in each pair being opposite to each other in the third direction, said first section of said rod body extending through a selected pair of said engaging holes.

* * * * *